United States Patent
Yamaguchi

(10) Patent No.: US 11,135,987 B2
(45) Date of Patent: Oct. 5, 2021

(54) INFORMATION PROCESSING DEVICE, INFORMATION PROCESSING METHOD, AND VEHICLE

(71) Applicant: SONY CORPORATION, Tokyo (JP)

(72) Inventor: Takamori Yamaguchi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/638,849

(22) PCT Filed: Aug. 8, 2018

(86) PCT No.: PCT/JP2018/029732
§ 371 (c)(1),
(2) Date: Feb. 13, 2020

(87) PCT Pub. No.: WO2019/039280
PCT Pub. Date: Feb. 28, 2019

(65) Prior Publication Data
US 2020/0189506 A1  Jun. 18, 2020

(30) Foreign Application Priority Data
Aug. 22, 2017 (JP) .............................. JP2017-159456

(51) Int. Cl.
*B60R 21/013* (2006.01)
*G06K 9/00* (2006.01)

(52) U.S. Cl.
CPC .. *B60R 21/013* (2013.01); *B60R 2021/01302* (2013.01); *G06K 9/00805* (2013.01)

(58) Field of Classification Search
CPC ........ B60R 21/013; B60R 2021/01302; G06K 9/00805
See application file for complete search history.

(56) References Cited

U.S. PATENT DOCUMENTS 6,285,778 B1 * 9/2001 Nakajima ............ G05D 1/0248
180/167
2016/0210735 A1 * 7/2016 Fukushima ........ G06K 9/00805
(Continued)

FOREIGN PATENT DOCUMENTS

JP   07-057199 A    3/1995
JP   07057199 A  *  3/1995
(Continued)

OTHER PUBLICATIONS

International Search Report and Written Opinion of PCT Application No. PCT/JP2018/029732, dated Oct. 30, 2018, 09 pages of ISRWO.

*Primary Examiner* — Mohamed Barakat
(74) *Attorney, Agent, or Firm* — Chip Law Group

(57) ABSTRACT

The present technique relates to an information processing device, an information processing method, a program, and a vehicle which realize improvement of accuracy of detecting a contact between a vehicle and an obstacle. The information processing device includes an obstacle detection unit that detects an obstacle in a surrounding area of a vehicle, a contact prediction unit that predicts contact between the vehicle and the obstacle on the basis of a detection result of the obstacle, an event detection unit that detects an event which occurs due to contact between the vehicle and an object, and a contact detection unit that detects contact between the vehicle and the obstacle on the basis of a detection result of the event, during a period of time during which a possibility of contact between the vehicle and the obstacle is predicted. The present technique is applicable to a vehicle, for example.

9 Claims, 8 Drawing Sheets

(56) References Cited

U.S. PATENT DOCUMENTS

2017/0225617 A1* 8/2017 Morimura .............. G09G 5/003
2018/0308364 A1* 10/2018 Kume ................ G06K 9/00812

FOREIGN PATENT DOCUMENTS

| JP | 09-136673 A | | 5/1997 | |
|---|---|---|---|---|
| JP | 09136673 A | * | 5/1997 | ........... G07C 5/0891 |
| JP | 2005-170073 A | | 6/2005 | |
| JP | 2005170073 A | * | 6/2005 | |
| JP | 2010-287190 A | | 12/2010 | |
| JP | 2015-143068 A | | 8/2015 | |
| JP | 2015143068 A | * | 8/2015 | |

* cited by examiner

F I G . 4
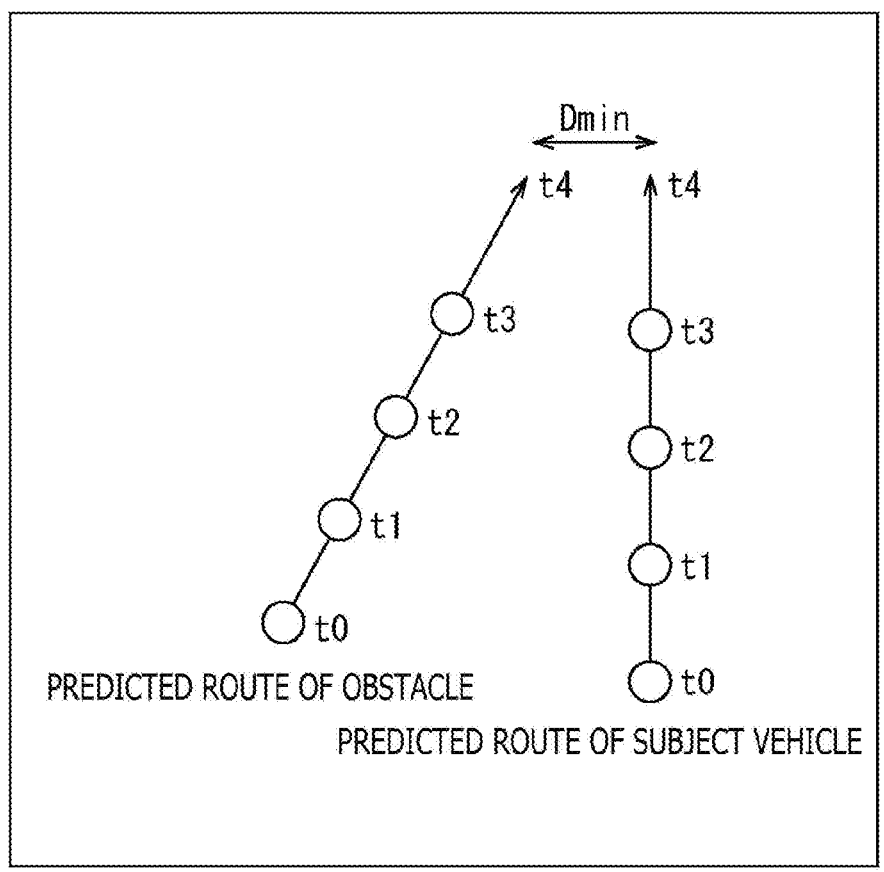

INFORMATION PROCESSING DEVICE, INFORMATION PROCESSING METHOD, AND VEHICLE

CROSS REFERENCE TO RELATED APPLICATIONS

This application is a U.S. National Phase of International Patent Application No. PCT/JP2018/029732 filed on Aug. 8, 2018, which claims priority benefit of Japanese Patent Application No. JP 2017-159456 filed in the Japan Patent Office on Aug. 22, 2017. Each of the above-referenced applications is hereby incorporated herein by reference in its entirety.

TECHNICAL FIELD

The present technique relates to an information processing device, an information processing method, a program, and a vehicle, and particularly, relates to an information processing device, an information processing method, a program, and a vehicle which are suitably used to detect contact between the vehicle and an obstacle.

BACKGROUND ART

Conventionally, a technique of determining the possibility of contact of an obstacle with a vehicle by using a distance image, has been proposed (for example, see PTL 1).

CITATION LIST

Patent Literature

[PTL 1]
Japanese Patent Laid-Open No. Hei 10-283462

SUMMARY

Technical Problem

However, in the invention disclosed in PTL 1, improvement of the accuracy of detecting whether or not a vehicle has actually come into contact with an obstacle is not taken into consideration.

The present technique has been made in view of the aforementioned circumstances, and thus, improves the accuracy of detecting contact between a vehicle and an obstacle.

Solution to Problem

An information processing device according to a first aspect of the present technique includes an obstacle detection unit that detects an obstacle in a surrounding area of a vehicle, a contact prediction unit that predicts contact between the vehicle and the obstacle on the basis of a detection result of the obstacle, an event detection unit that detects an event which occurs due to contact between the vehicle and an object, and a contact detection unit that detects contact between the vehicle and the obstacle on the basis of a detection result of the event, during a period of time during which a possibility of contact between the vehicle and the obstacle is predicted.

An information processing method according to the first aspect of the present technique includes, by means of an information processing device, detecting an obstacle in a surrounding area of a vehicle, predicting contact between the vehicle and the obstacle on the basis of a detection result of the obstacle, detecting an event which occurs due to contact between the vehicle and an object, and detecting contact between the vehicle and the obstacle on the basis of a detection result of the event, during a period of time during which a possibility of contact between the vehicle and the obstacle is predicted.

A program according to the first aspect of the present technique causes a computer to execute a process including an obstacle detection step of detecting an obstacle in a surrounding area of a vehicle, a contact prediction step of predicting contact between the vehicle and the obstacle on the basis of a detection result of the obstacle, an event detection step of detecting an event which occurs due to contact between the vehicle and an object, and a contact detection step of detecting contact between the vehicle and the obstacle on the basis of a detection result of the event, during a period of time during which a possibility of contact between the vehicle and the obstacle is predicted.

A vehicle according to a second aspect of the present technique includes a data acquisition unit that acquires data for use in detection of an obstacle in a surrounding area and detection of an event which occurs due to contact with an object, an obstacle detection unit that detects the obstacle on the basis of the acquired data, a contact prediction unit that predicts contact with the obstacle on the basis of a detection result of the obstacle, an event detection unit that detects the event on the basis of the acquired data, and a contact detection unit that detects contact with the obstacle on the basis of a detection result of the event, during a period of time during which a possibility of contact between the vehicle and the obstacle is predicted.

In the first aspect of the present technique, an obstacle in the surrounding area of the vehicle is detected, contact between the vehicle and the obstacle is predicted on the basis of the detection result of the obstacle, an event which occurs due to contact between the vehicle and an object is detected, and the contact between the vehicle and the obstacle is detected on the basis of the detection result of the event, during a period of time during which a possibility of contact between the vehicle and the obstacle is predicted.

In the second aspect of the present technique, data for use in detection of an obstacle in the surrounding area and detection of an event which occurs due to contact with an object is acquired, the obstacle is detected on the basis of the acquired data, contact with the obstacle is predicted on the basis of the detection result of the obstacle, the event is detected on the basis of the acquired data, and contact with the obstacle is detected on the basis of the detection result of the event, during a period of time during which a possibility of contact with the obstacle is predicted.

Advantage Effects of Invention

According to the first or second aspect of the present technique, contact between a vehicle and an obstacle can be detected. In particular, according to the first or second aspect of the present technique, the accuracy of detecting contact between a vehicle and an obstacle can be improved.

Note that the aforementioned effects are not limitative, and any one of the effects disclosed herein may be provided.

BRIEF DESCRIPTION OF DRAWINGS

FIG. 4 is a diagram depicting an example of predicted routes of a subject vehicle and an obstacle.

DESCRIPTION OF EMBODIMENTS

Hereinafter, embodiments for implementing the present technique will be explained. The explanations will be given in the following order.

1. Configuration Example of Vehicle Control System
2. First Embodiment
3. Second Embodiment
4. Modification
5. Others

1. Configuration Example of Vehicle Control System

Figure 1:
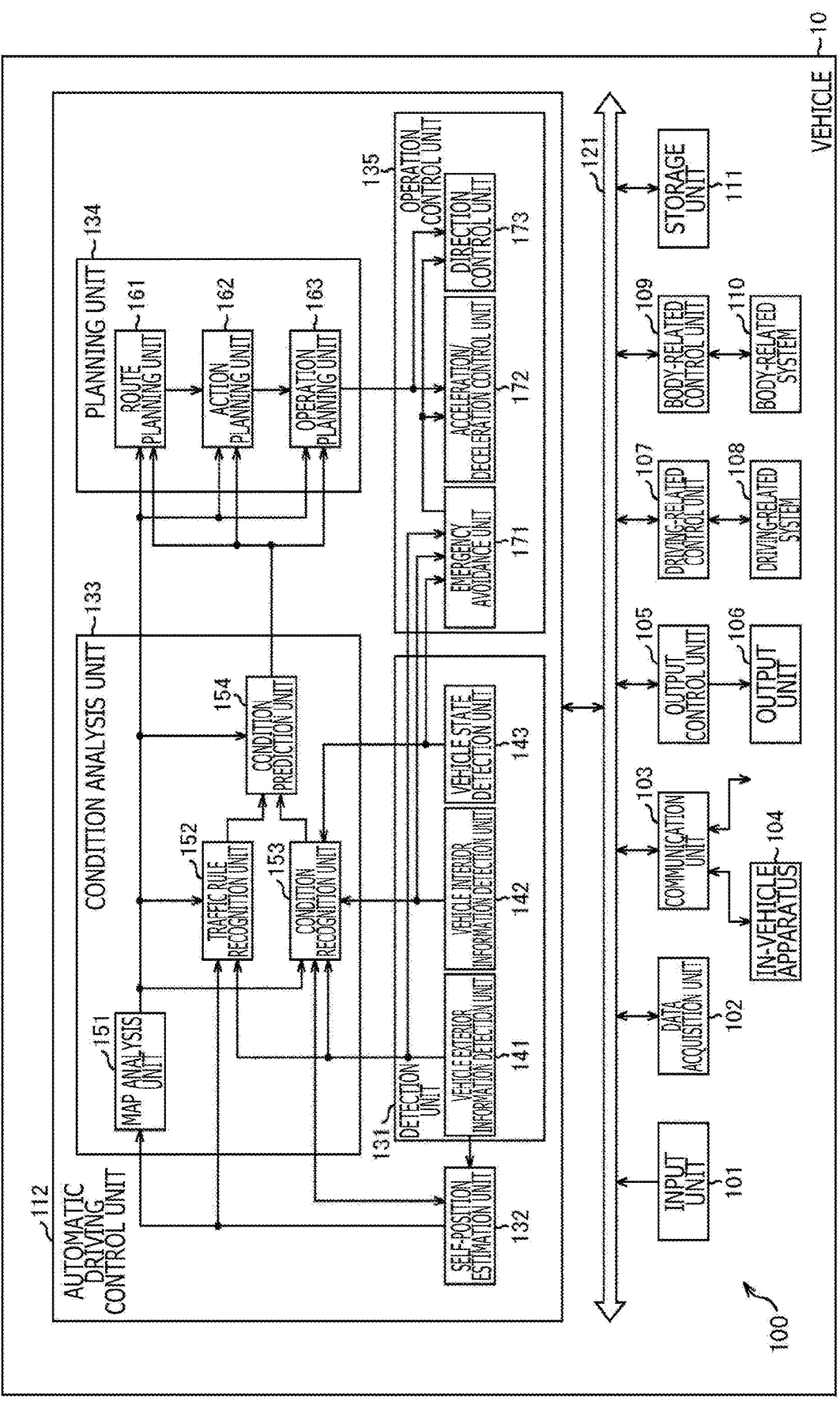
FIG. 1 is a block diagram depicting a schematic functional configuration example of a vehicle control system to which the present technique is applicable.

FIG. 1 is a block diagram depicting a schematic functional configuration example of a vehicle control system 100 which is one example of a movable body control system to which the present technique is applicable.

The vehicle control system 100 is provided to a vehicle 10, and performs various types of control in the vehicle 10. Note that the vehicle 10 is hereinafter referred to as a subject vehicle to be distinguished from other vehicles.

The vehicle control system 100 includes an input unit 101, a data acquisition unit 102, a communication unit 103, an in-vehicle apparatus 104, an output control unit 105, an output unit 106, a driving-related control unit 107, a driving-related system 108, a body-related control unit 109, a body-related system 110, a storage unit 111, and an automatic driving control unit 112. The input unit 101, the data acquisition unit 102, the communication unit 103, the output control unit 105, the driving-related control unit 107, the body-related control unit 109, the storage unit 111, and the automatic driving control unit 112 are mutually connected via a communication network 121. The communication network 121 includes, for example, a bus or an in-vehicle communication network conforming to a given standard such as a CAN (Controller Area Network), a LIN (Local Interconnect Network), a LAN (Local Area Network), or FlexRay (registered trademark). Note that the units in the vehicle control system 100 may be connected directly to one another without the communication network 121.

Note that, hereinafter, communication that is performed by the units in the vehicle control system 100 via the communication network 121 will be explained without the term communication network 121. For example, communication that is performed between the input unit 101 and the automatic driving control unit 112 via the communication network 121 will simply be explained by the expression: communication between the input unit 101 and the automatic driving control unit 112 is performed.

The input unit 101 includes a device that is used by an occupant to input various types of data, commands, or the like. For example, the input unit 101 includes an operation device such as a touch panel, a button, a microphone, a switch, and a lever, and includes an operation device through which an input can be made by a method using a voice or a gesture rather than a manual operation. In addition, for example, the input unit 101 may be a remote control device that uses infrared rays or other radio waves, or may be an external connection device such as a mobile device or a wearable device compatible with operation of the vehicle control system 100. The input unit 101 generates input signals on the basis of data, a command, or the like inputted by an occupant, and supplies the input signals to the units in the vehicle control system 100.

The data acquisition unit 102 includes various sensors for acquiring data for use in processing in the vehicle control system 100, and supplies the acquired data to the units in the vehicle control system 100.

For example, the data acquisition unit 102 includes various sensors for detecting states, etc., of the vehicle 10. Specifically, for example, the data acquisition unit 102 includes a gyro sensor, an acceleration sensor, an inertial measurement unit (IMU), and a sensor for detecting the operation amount of an accelerator pedal, the operation amount of a brake pedal, the steering angle of a steering wheel, the rotational speed of an engine, the rotational speed of a motor, the rotational speed of a wheel, or the like.

In addition, for example, the data acquisition unit 102 includes various sensors for detecting information regarding the outside of the vehicle 10. Specifically, for example, the data acquisition unit 102 includes an image capturing device such as a ToF (Time Of Flight) camera, a stereo camera, a monocular camera, an infrared camera, or other cameras. Moreover, for example, the data acquisition unit 102 includes an environment sensor for detecting weather or the like, and a surrounding-area information detection sensor for detecting an object in the surrounding area of the vehicle 10. For example, the environment sensor includes a raindrop sensor, a fog sensor, a sunshine sensor, a snow sensor, or the like. The surrounding-area information detection sensor includes, for example, an ultrasonic sensor, a radar, a LiDAR (Light Detection and Ranging, Laser Imaging Detection and Ranging), a sonar, or the like.

Furthermore, for example, the data acquisition unit 102 includes various sensors for detecting the current position of the vehicle 10. Specifically, for example, the data acquisition unit 102 includes a GNSS (Global Navigation Satellite System) receiver for receiving GNSS signals from GNSS satellites, or the like.

Moreover, for example, the data acquisition unit 102 includes various sensors for detecting information regarding the interior of the vehicle. Specifically, for example, the data acquisition unit 102 includes an image capturing device that captures an image of a driver, a biological sensor that detects biological information regarding the driver, a microphone that collects sounds in the vehicle interior, and the like. The biological sensor is provided to a seat surface or a steering wheel, for example, and detects biological information regarding an occupant who is seated on a seat or a driver who is grasping the steering wheel.

The communication unit 103 communicates with the in-vehicle apparatus 104, various apparatuses outside the vehicle, a server, a base station, and the like, transmits data supplied from the units in the vehicle control system 100, and supplies received data to the units in the vehicle control system 100. Note that a communication protocol supported by the communication unit 103 is not limited to a particular one and that the communication unit 103 may support a plurality of types of communication protocols.

For example, the communication unit 103 wirelessly communicates with the in-vehicle apparatus 104 through a wireless LAN, Bluetooth (registered trademark), NFC (Near Field Communication), WUSB (Wireless USB), or the like. In addition, for example, the communication unit 103 performs wired communication with the in-vehicle apparatus 104 by using a USB (Universal Serial Bus), an HDMI (registered trademark) (High-Definition Multimedia Interface), an MHL (Mobile High-definition Link), or the like, via a connection terminal which is not illustrated (and a cable, if needed).

In addition, for example, the communication unit 103 communicates with an apparatus (e.g., an application server or a control server) that exists in an external network (e.g., the Internet, a cloud network, or a company-specific network) via a base station or an access point. Moreover, for example, the communication unit 103 communicates with a terminal (e.g., a pedestrian's or shop terminal, or an MTC (Machine Type Communication) terminal) that exists in the vicinity of the vehicle 10 by using a P2P (Peer To Peer) technology. Furthermore, for example, the communication unit 103 performs V2X communication such as vehicle-to-vehicle communication, vehicle-to-infrastructure communication, vehicle-to-home communication which is performed between the vehicle 10 and a home, or vehicle-to-pedestrian communication. In addition, for example, the communication unit 103 includes a beacon reception unit to receive radio waves or electromagnetic waves emitted from a wireless station or the like installed on a road, and thereby acquires such information as the current position, traffic congestion, a traffic regulation, or required time.

The in-vehicle apparatus 104 includes a mobile or wearable device which is possessed by an occupant, an information device which is brought into or attached to the vehicle 10, and a navigation device which searches for a route to a freely-selected destination, for example.

The output control unit 105 controls output of various types of information to an occupant in the vehicle 10 or to the outside of the vehicle. For example, the output control unit 105 generates an output signal including at least either visual information (e.g., image data) or audio information (e.g., sound data), and supplies the output signal to the output unit 106, thereby controlling output of visual information and audio information from the output unit 106. Specifically, for example, the output control unit 105 generates a bird's-eye view image, a panoramic image, or the like, by combining image data captured by separate image capturing devices in the data acquisition unit 102, and supplies an output signal including the generated image to the output unit 106. In addition, for example, the output control unit 105 generates sound data including an alarm sound or an alarm message for risks such as a collision, contact, or an entry to a danger area, and supplies an output signal including the generated sound data to the output unit 106.

The output unit 106 includes a device capable of outputting visual information or audio information to an occupant in the vehicle 10 or to the outside of the vehicle. For example, the output unit 106 includes a display device, an instrument panel, an audio speaker, a headphone, a wearable device such as a glasses-type display which is worn by an occupant, a projector, a lamp, and the like. Besides a device having a normal display, the display device included in the output unit 106 may, for example, be a device that displays visual information in a driver's visual field such as a head-up display, a transmission-type display, or a device having an AR (Augmented Reality) display function.

The driving-related control unit 107 controls the driving-related system 108 by generating various control signals and supplying the control signals to the driving-related system 108. In addition, for example, the driving-related control unit 107 reports the controlled state of the driving-related system 108 by supplying control signals to units other than the driving-related system 108, as needed.

The driving-related system 108 incudes various devices concerning driving of the vehicle 10. For example, the driving-related system 108 includes a driving force generation device for generating driving force such as an internal combustion engine or a driving motor, a driving force transmission mechanism for transmitting driving force to wheels, a steering mechanism for adjusting a steering angle, a brake device for generating braking force, an ABS (Antilock Brake System), an ESC (Electronic Stability Control), an electric power steering device, and the like.

The body-related control unit 109 controls the body-related system 110 by generating various control signals and supplying the control signals to the body-related system 110. In addition, for example, the body-related control unit 109 reports the controlled state of the body-related system 110, by supplying control signals to units other than the body system 110, as needed.

The body-related system 110 includes various body-related devices which are mounted in a vehicle body. For example, the body-related system 110 includes a keyless entry system, a smart key system, a power window device, a power seat, a steering wheel, an air conditioner, various lamps (e.g., a head lamp, a back lamp, a brake lamp, a blinker, a fog lamp), and the like.

The storage unit 111 includes a magnetic storage device such as a ROM (Read Only Memory), a RAM (Random Access Memory), or an HDD (Hard Disc Drive), a semiconductor storage device, an optical storage device, and a magneto-optical storage device, for example. The storage unit 111 stores various types of programs and data, etc., which are used by the units in the vehicle control system 100. For example, the storage unit 111 stores map data including a three-dimensional high-accuracy map such as a dynamic map, a global map that has lower accuracy than a high-accuracy map but covers a wider area, and a local map including information regarding the surrounding area of the vehicle 10.

The automatic driving control unit 112 performs control concerning automatic driving such as autonomous traveling or driving assist. Specifically, for example, the automatic driving control unit 112 performs cooperation control for implementing ADAS (Advanced Driver Assistance System) functions including collision avoidance or shock relaxation of the vehicle 10, following traveling based on an inter-vehicle distance, traveling at fixed vehicle speed, an alarm regarding a collision of the vehicle 10, or an alarm regarding lane deviation of the vehicle 10. In addition, for example, the automatic driving control unit 112 performs cooperation control for automatic driving, etc., in which autonomous traveling is conducted without depending on an operation performed by a driver. The automatic driving control unit 112 includes a detection unit 131, an self-position estimation unit 132, a condition analysis unit 133, a planning unit 134, and an operation control unit 135.

The detection unit 131 detects various types of information that are necessary for control of automatic driving. The detection unit 131 includes a vehicle exterior information detection unit 141, a vehicle interior information detection unit 142, and a vehicle state detection unit 143.

The vehicle exterior information detection unit 141 executes a detection process for information regarding the outside of the vehicle 10 on the basis of data or signals from the units in the vehicle control system 100. For example, the vehicle exterior information detection unit 141 executes a process of detecting, recognizing, and tracking an object in the surrounding area of the vehicle 10, and executes a process of detecting the distance to the object. Examples of an object to be detected include a vehicle, a person, an obstacle, a structure, a road, a traffic signal, a traffic sign, and a road marking. In addition, for example, the vehicle exterior information detection unit 141 executes a detection process for the surrounding environment of the vehicle 10. Examples of the surrounding environment to be detected include the weather, temperature, humidity, brightness, and the condition of a road surface. The vehicle exterior information detection unit 141 supplies data indicating a result of the detection process to the self-position estimation unit 132, a map analysis unit 151, a traffic rule recognition unit 152, and a condition recognition unit 153 in the condition analysis unit 133, and an emergency avoidance unit 171 in the operation control unit 135, etc.

The vehicle interior information detection unit 142 executes a detection process for information regarding the interior of the vehicle on the basis of data or signals from the units in the vehicle control system 100. For example, the vehicle interior information detection unit 142 executes a process of authenticating and recognizing a driver, a process of detecting the driver's state, a process of detecting occupants, a process of detecting the vehicle interior environment, and the like. Examples of the driver's state to be detected include physical condition, wakefulness level, concentration level, fatigue level, and a visual line direction. Examples of a vehicle interior environment to be detected include temperature, humidity, brightness, and smell. The vehicle interior information detection unit 142 supplies data indicating a result of the detection process to the condition recognition unit 153 in the condition analysis unit 133 and the emergency avoidance unit 171 in the operation control unit 135, etc.

The vehicle state detection unit 143 executes a detection process for a state of the vehicle 10 on the basis of data and signals from the units in the vehicle control system 100. Examples of a state of the vehicle 10 to be detected include speed, acceleration, a steering angle, the presence/absence of an abnormality, details of the abnormality, the state of a driving operation, the position and inclination of a power seat, a door lock state, and the states of other in-vehicle apparatuses. The vehicle state detection unit 143 supplies data indicating a result of the detection process to the condition recognition unit 153 in the condition analysis unit 133 and the emergency avoidance unit 171 in the operation control unit 135, etc.

The self-position estimation unit 132 executes an estimation process of the position and posture, etc., of the vehicle 10, on the basis of data or signals from the units in the vehicle control system 100 such as the vehicle exterior information detection unit 141 and the condition recognition unit 153 in the condition analysis unit 133. Also, the self-position estimation unit 132 generates a local map (hereinafter, referred to as a self-position estimation map) for use in estimation of the self position, as needed. A high-precision map using a technology such as SLAM (Simultaneous Localization and Mapping) is used as the self-position estimation map. The self-position estimation unit 132 supplies data indicating a result of the estimation process to the map analysis unit 151, the traffic rule recognition unit 152, and the condition recognition unit 153, etc., in the condition analysis unit 133. Also, the self-position estimation unit 132 stores the self-position estimation map in the storage unit 111.

The condition analysis unit 133 executes an analysis process for the condition of the vehicle 10 and the condition of the surrounding area. The condition analysis unit 133 includes the map analysis unit 151, the traffic rule recognition unit 152, the condition recognition unit 153, and the condition prediction unit 154.

The map analysis unit 151 constructs a map including information necessary for automatic driving processing by executing a process of analyzing various maps stored in the storage unit 111 while using data or signals from the units in the vehicle control system 100 such as the self-position estimation unit 132 and the vehicle exterior information detection unit 141, as needed. The map analysis unit 151 supplies the constructed map to the traffic rule recognition unit 152, the condition recognition unit 153, and the condition prediction unit 154, and to a route planning unit 161, an action planning unit 162, and an operation planning unit 163 in the planning unit 134, etc.

The traffic rule recognition unit 152 executes a recognition process for a traffic rule in the surrounding area of the vehicle 10 on the basis of data or signals from the units in the vehicle control system 100 such as the self-position estimation unit 132, the vehicle exterior information detection unit 141, and the map analysis unit 151. For example, the position and state of a traffic signal in the surrounding area of the vehicle 10, the details of a traffic regulation in the surrounding area of the vehicle 10, a lane in which traveling is possible, and the like are recognized through the recognition process. The traffic rule recognition unit 152 supplies data indicating a result of the recognition process to the condition prediction unit 154, etc.

The condition recognition unit 153 executes a recognition process for the condition concerning the vehicle 10 on the basis of data and signals from the units in the vehicle control system 100 such as the self-position estimation unit 132, the vehicle exterior information detection unit 141, the vehicle interior information detection unit 142, the vehicle state detection unit 143, and the map analysis unit 151. For example, the condition recognition unit 153 executes a recognition process for the condition of the vehicle 10, the condition of the surrounding area of the vehicle 10, the condition of a driver of the vehicle 10, and the like. Also, the condition recognition unit 153 generates a local map (hereinafter, referred to as a condition recognition map) for use in recognition of condition of the surrounding area of the vehicle 10, as needed. For example, an occupancy grid map is used as the condition recognition map.

Examples of the condition of the vehicle 10 to be recognized include the position, the attitude, and motion (e.g., speed, acceleration, movement direction, or the like) of the vehicle 10, the presence/absence of an abnormality, and the details of the abnormality. Examples of the condition of the surrounding area of the vehicle 10 to be recognized include the type and position of a static object in the surrounding area, the type, position, and motion (e.g., speed, acceleration, movement direction, or the like) of a moving object in the surrounding area, a surrounding road structure and the condition of the road surface, and the weather, temperature, humidity, and brightness of the surrounding area. Examples of a condition of the driver to be recognized include physical condition, wakefulness level, concentration level, fatigue level, movement of a visual line, and a driving operation.

The condition recognition unit 153 supplies data indicating a result of the recognition process (including the condition recognition map, as needed) to the self-position estimation unit 132 and the condition prediction unit 154, etc. Also, the condition recognition unit 153 stores the condition recognition map in the storage unit 111.

The condition prediction unit 154 executes a prediction process for the condition concerning the vehicle 10 on the basis of data or signals from the units in the vehicle control system 100 such as the map analysis unit 151, the traffic rule recognition unit 152, and the condition recognition unit 153. For example, the condition prediction unit 154 executes a prediction process for the condition of the vehicle 10, the condition of the surrounding area of the vehicle 10, and the condition of the driver, etc.

Examples of the condition of the vehicle 10 to be predicted include behavior of the vehicle 10, occurrence of an abnormality, and a travelable distance. Examples of the condition of the surrounding area of the vehicle 10 to be predicted include behavior of a moving object, a state change of a traffic signal, and a change in an environment such as the weather in the surrounding area of the vehicle 10. Examples of the condition of the driver to be predicted include behavior and the health condition of the driver.

The condition prediction unit 154 supplies data indicating a result of the prediction process as well as data from the traffic rule recognition unit 152 and the condition recognition unit 153, to the route planning unit 161, the action planning unit 162, and the operation planning unit 163 in the planning unit 134, etc.

The route planning unit 161 plans a route to a destination on the basis of data or signals from the units in the vehicle control system 100 such as the map analysis unit 151 and the condition prediction unit 154. For example, the route planning unit 161 sets a route from the current position to a designated destination on the basis of a global map. In addition, for example, the route planning unit 161 changes the route, as appropriate, on the basis of the condition of traffic congestion, an accident, a traffic regulation, a roadwork, etc., and the health condition of the driver, etc. The route planning unit 161 supplies data indicating the planned route to the action planning unit 162, etc.

The action planning unit 162 plans an action of the vehicle 10 for safely traveling the route planned by the route planning unit 161 within a planned period of time, on the basis of data or signals from the units in the vehicle control system 100 such as the map analysis unit 151 and the condition prediction unit 154. For example, the action planning unit 162 makes a plan regarding a travel start, a travel stop, a travel direction (e.g., forward traveling, rearward traveling, a left turn, a right turn, a direction change), a travel lane, a travel speed, and passing, etc. The action planning unit 162 supplies data indicating the planned action of the vehicle 10 to the operation planning unit 163, etc.

The operation planning unit 163 plans an operation of the vehicle 10 for implementing the action planned by the action planning unit 162 on the basis of data or signals from the units in the vehicle control system 100 such as the map analysis unit 151 and the condition prediction unit 154. For example, the operation planning unit 163 makes a plan regarding acceleration, deceleration, a travel trajectory, or the like. The operation planning unit 163 supplies data indicating the planned operation of the vehicle 10 to an acceleration/deceleration control unit 172 and a direction control unit 173 in the operation control unit 135, etc.

The operation control unit 135 controls operation of the vehicle 10. The operation control unit 135 includes the emergency avoidance unit 171, the acceleration/deceleration control unit 172, and the direction control unit 173.

The emergency avoidance unit 171 executes a detection process for an emergency such as a collision, contact, an entry to a danger area, a driver's abnormality, and an abnormality in the vehicle 10 on the basis of the detection results obtained by the vehicle exterior information detection unit 141, the vehicle interior information detection unit 142, and the vehicle state detection unit 143. In the case where occurrence of an emergency is detected, the emergency avoidance unit 171 makes a plan regarding an operation of the vehicle 10 for avoiding the emergency such as a sudden stop or a quick turn. The emergency avoidance unit 171 supplies data indicating the planned operation of the vehicle 10 to the acceleration/deceleration control unit 172 and the direction control unit 173, etc.

The acceleration/deceleration control unit 172 performs acceleration/deceleration control to implement the operation of the vehicle 10 planned by the operation planning unit 163 or the emergency avoidance unit 171. For example, the acceleration/deceleration control unit 172 calculates a control target value for a driving force generating device or a braking device for implementing the planned acceleration, deceleration, or quick stop, and supplies a control command indicating the calculated control target value to the driving-related control unit 107.

The direction control unit 173 performs direction control for implementing the operation of the vehicle 10 planned by the operation planning unit 163 or the emergency avoidance unit 171. For example, the direction control unit 173 calculates a steering mechanism control target value for implementing the travel trajectory or quick turn planned by the operation planning unit 163 or the emergency avoidance unit 171, and supplies a control command indicating the calculated control target value to the driving-related control unit 107.

2. First Embodiment

Next, a first embodiment according to the present technique will be explained with reference to FIGS. 2 to 5.

Note that the first embodiment mainly pertains to processing in the detection unit 131 and the condition analysis unit 133 in the vehicle control system 100 in FIG. 1.

<Configuration Example of Contact Detection System>

Figure 2:
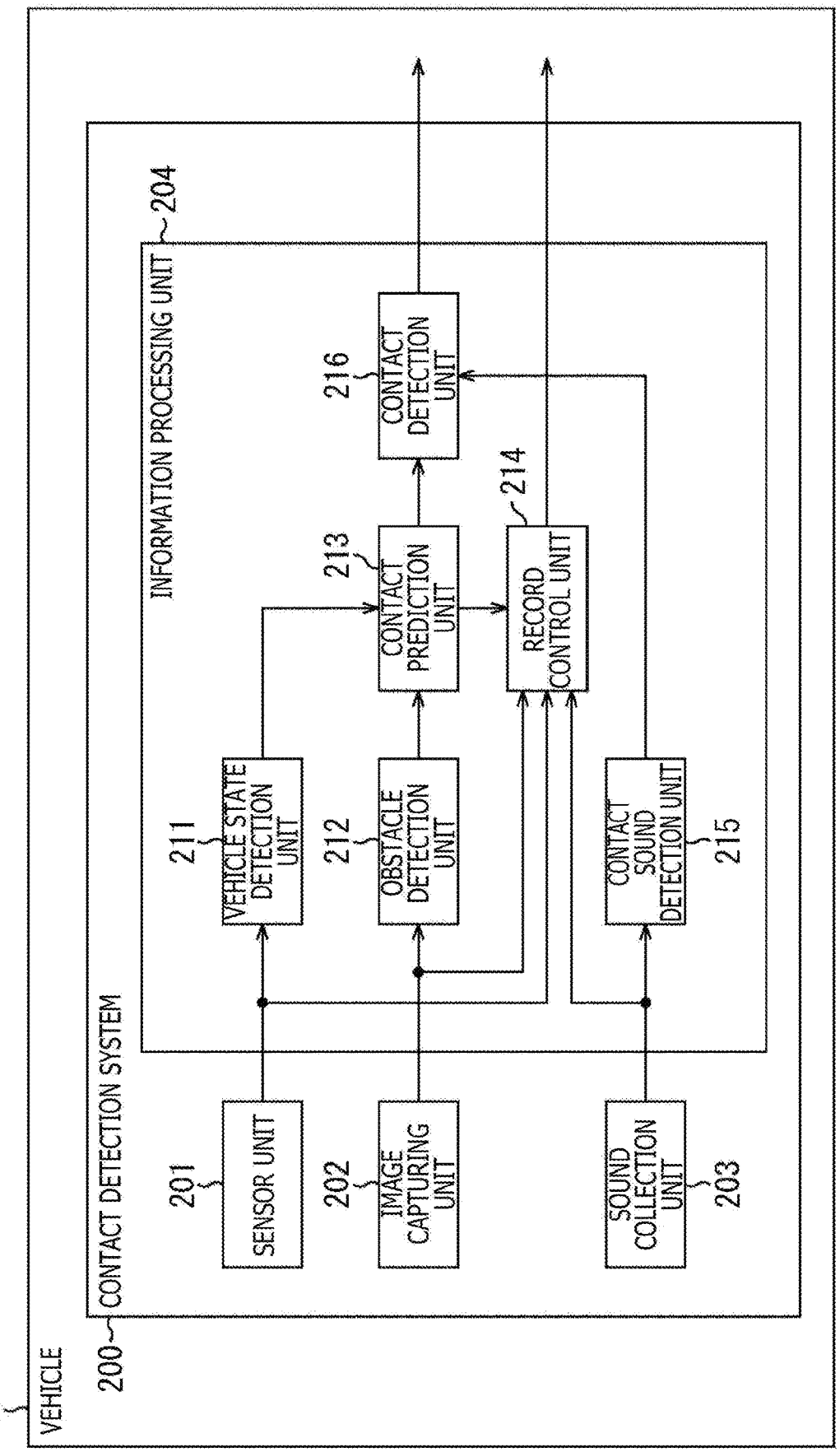
FIG. 2 is a block diagram depicting a first embodiment of a contact detection system to which the present technique has been applied.

FIG. 2 is a block diagram depicting a configuration example of a contact detection system 200 which is the first embodiment of a contact detection system to which the present technique has been applied.

The contact detection system 200 executes a detection process for contact between an obstacle and the vehicle 10 having the contact detection system 200 provided thereto. For example, the contact detection system 200 detects any contact between the vehicle 10 and an obstacle ranging from light contact between the vehicle 10 and an obstacle to a violent collision between the vehicle 10 and an obstacle, irrespective of the level of the contact. Note that, a limitation may be placed on the range of the level of a contact to be detected by the contact detection system 200.

The contact detection system 200 includes a sensor unit 201, an image capturing unit 202, a sound collection unit 203, and an information processing unit 204.

The sensor unit 201 includes various sensors for detecting the condition of the vehicle 10, for example. The sensor unit 201 includes a gyro sensor, an acceleration sensor, an inertial measurement unit (IMU), and a sensor for detecting the operation amount of an accelerator pedal, the operation amount of a brake pedal, the steering angle of a steering wheel, the rotational speed of an engine, the rotational speed of a motor, or the rotational speed of a wheel, for example. In addition, for example, the sensor unit 201 includes a surrounding-area information detection sensor for detecting an object in the surrounding area of the vehicle 10. The surrounding-area information detection sensor includes an ultrasound sensor, a radar, a LiDAR, a sonar, or the like. The sensor unit 201 supplies sensor data outputted from the sensors, to a vehicle state detection unit 211, an obstacle detection unit 212, and a record control unit 214 in the information processing unit 204.

The image capturing unit 202 includes an image capturing device for photographing the surrounding area of the vehicle 10, and supplies image data obtained by photographing to the vehicle state detection unit 211, the obstacle detection unit 212, and the record control unit 214 in the information processing unit 204.

Note that the number of installed image capturing devices and the installation positions thereof can freely be set. However, it is desirable to install the image capturing devices so as to photograph the surrounding area of the vehicle 10 from every direction in order to reliably detect contact with an obstacle. In particular, it is desirable to install the image capturing devices so as to photograph a direction of a dead angle of the driver.

The sound collection unit 203 includes a microphone that collects a sound in the surrounding area of the vehicle 10, and supplies sound data indicating the collected sound to the record control unit 214 and a contact sound detection unit 215 in the information processing unit 204.

Note that the number of installed microphones and the installation positions thereof can freely be set. However, it is desirable to set the microphones such that a contact sound which is generated when contact between an obstacle and the body of the vehicle 10 occurs can reliably be detected, irrespective of the position of the contact.

For example, the microphones are installed in the interior of the vehicle 10. This enables detection of a contact sound under the same condition as that of occupants including the driver.

For example, the microphones are installed in contact with the body of the vehicle 10. Accordingly, the accuracy of detecting the sound of contact with the body of the vehicle 10 is improved.

Note that, in order to prevent the influence of noise caused by an engine sound or a motor sound in the vehicle 10, it is desirable to install the microphones at positions distant from an engine or a motor.

Note that the sensor unit 201, the image capturing unit 202, and the sound collection unit 203 correspond to parts of the data acquisition unit 102 in FIG. 1, for example.

The information processing unit 204 executes a detection process for contact between the vehicle 10 and an obstacle. The information processing unit 204 includes the vehicle state detection unit 211, the obstacle detection unit 212, a contact prediction unit 213, the record control unit 214, the contact sound detection unit 215, and a contact detection unit 216.

The vehicle state detection unit 211 detects a state of the vehicle 10, and particularly, detects movement of the vehicle 10, on the basis of sensor data from the sensor unit 201, and supplies the detection result to the contact prediction unit 213.

The obstacle detection unit 212 detects an obstacle in the surrounding area of the vehicle 10 on the basis of the sensor data from the sensor unit 201 and image data from the image capturing unit 202, and supplies the detection result to the contact prediction unit 213.

The contact prediction unit 213 predicts movement of the vehicle and movement of the obstacle on the basis of the detection result of the state of the vehicle 10 and the detection result of the obstacle in the surrounding area of the vehicle 10. Further, the contact prediction unit 213 predicts contact between the vehicle 10 and the obstacle on the basis of the prediction result of movement of the vehicle 10 and movement of the obstacle, and supplies the prediction result to the record control unit 214 and the contact detection unit 216.

The record control unit 214 controls records of the sensor data, the image data, and the sound data on the basis of the prediction result of contact between the vehicle 10 and the obstacle.

The contact sound detection unit 215 detects a contact sound which is generated when the vehicle 10 comes into contact with the obstacle, on the basis of the sound data from the sound collection unit 203. Further, the contact sound detection unit 215 deduces the type of an object that has a possibility of having been brought into contact with the vehicle 10 on the basis of the contact sound. The contact sound detection unit 215 supplies the detection result of the contact sound and the deduction result of the object type to the contact detection unit 216.

The contact detection unit 216 detects contact between the vehicle 10 and the obstacle on the basis of the prediction result of the contact between the vehicle 10 and the obstacle obtained by the contact prediction unit 213, and the detection result of the contact sound and the deduction result of the object type obtained by the contact sound detection unit 215. The contact detection unit 216 supplies the detection result to the action planning unit 162 and the operation planning unit 163, etc. in FIG. 1, for example.

<Contact Detection Process>

Next, a contact detection process which is executed by the contact detection system 200 will be explained with reference to the flowchart in FIG. 3. Note that this process is started when an operation to start driving is performed after startup of the vehicle 10, for example, when an ignition switch, a power switch, a start switch, or the like of the vehicle 10 is turned on. In addition, this process is ended when an operation to end driving is performed, for example, when the ignition switch, the power switch, the start switch, or the like of the vehicle 10 is turned off.

In step S1, the vehicle state detection unit 211 starts detection of the movement of the vehicle 10. Specifically, the vehicle state detection unit 211 starts detection of the movement of the vehicle 10 on the basis of the sensor data from the sensor unit 201. For example, detection of the speed, the acceleration, the moving direction, and the like of the vehicle 10 is started. Further, the vehicle state detection unit 211 starts a process of supplying the detection result to the contact prediction unit 213.

In step S2, the obstacle detection unit 212 starts detection of an obstacle in the surrounding area of the vehicle 10. Specifically, the obstacle detection unit 212 starts the detection of an obstacle in the surrounding area of the vehicle 10 on the basis of the sensor data from the sensor unit 201 and the image data from the image capturing unit 202. For example, detection of the presence/absence, the position, the size, the movement (e.g., speed, acceleration, moving direction), a type (e.g., a child, an adult, an elderly person, an automobile, a truck, a bus, a bike) of an obstacle, or the like is started. In addition, the obstacle detection unit 212 starts a process of supplying the detection result to the contact prediction unit 213.

Note that any method can be used as a method for detecting obstacles. In addition, the type of obstacles to be detected and a method for classifying obstacles can freely be set. For example, all objects detected in the surrounding area of the vehicle 10 may be detected as obstacles, or only an object having a possibility of becoming an obstacle to traveling of the vehicle 10 may be detected as an obstacle.

In step S3, the contact sound detection unit 215 starts detection of a contact sound. Specifically, the contact sound detection unit 215 starts the detection of a contact sound on the basis of the sound data from the sound collection unit 203. For example, detection of the presence/absence, the volume, the generation position, etc., of a contact sound is started. Further, in the case where a contact sound is detected, the contact sound detection unit 215 starts deduction of the type of an object having a possibility of having been brought into contact with the vehicle 10, on the basis of the waveform, etc., of the detected contact sound. In addition, the contact sound detection unit 215 starts supplying the detection result of the contact sound, and the deduction result of the object type to the contact detection unit 216.

Note that any method can be used as a method for detecting a contact sound and a method for deducing an object type.

In step S4, the contact prediction unit 213 predicts movement of the vehicle 10 and movement of the obstacle. Specifically, the contact prediction unit 213 predicts future movement of the vehicle 10 on the basis of the movement of the vehicle 10 detected so far by the vehicle state detection unit 211. Further, the contact prediction unit 213 predicts future movement of the obstacle on the basis of the movement of the obstacle detected so far by the obstacle detection unit 212. Note that, in the case where plural obstacles are detected, future movement of each of the obstacles is predicted.

As a result of this process, a route of the vehicle 10 and a route of the obstacle from time t3 to time t4 are predicted on the basis of movement of the vehicle 10 and movement of the obstacle from time t0 to time t3, as depicted in FIG. 4, for example.

Note that any method can be used as a method for predicting movement of the vehicle 10 and movement of an obstacle.

In step S5, the contact prediction unit 213 determines whether or not there is a possibility of contact with the obstacle. For example, in the case where there is no obstacle for which the distance to the vehicle 10 is predicted to become lower than a prescribed threshold in a period of time until a predetermined time elapses from the current point of time, the contact prediction unit 213 determines that there is no possibility of contact with the obstacle. Then, the contact prediction unit 213 reports, to the contact detection unit 216, that there is no possibility of contact with the obstacle, and the process proceeds to step S6.

For example, in the case where a minimum distance Dmin between the vehicle 10 and the obstacle during a period of time from time t3 to time t4 in FIG. 4, is equal to or greater than a predetermined threshold, it is determined that there is no possibility of contact with the obstacle.

Note that a target period of time for determination as to whether or not there is a possibility of contact with the obstacle, may be set to a period of time that continues until a next prediction process is performed by the contact prediction unit 213, for example.

In step S6, the contact detection unit 216 determines whether or not a contact sound is detected, on the basis of the detection result obtained by the contact sound detection unit 215. In the case where it is determined that no contact sound is detected, the process returns to step S4.

Thereafter, until it is determined that there is a possibility of contact with the obstacle in step S5, or until it is determined that a contact sound is detected in step S6, steps S4 to S6 are executed repeatedly.

On the other hand, in the case where it is determined that a contact sound is detected in step S6, the process proceeds to step S7.

In step S7, the contact detection unit 216 reports that no contact with an obstacle has occurred. For example, the contact detection unit 216 supplies data indicating that no contact with the obstacle has occurred, to the action planning unit 162 and the operation planning unit 163, etc., in FIG. 1.

Accordingly, erroneous detection of contact with an obstacle and inappropriate control of the operation of the vehicle 10 are prevented, for example. In addition, for example, an occupant such as the driver can be informed that a generated sound is not a contact sound which is generated due to contact with the obstacle, for example.

Thereafter, the process returns to step S4, and, until it is determined that there is a possibility of contact with an obstacle in step S5, steps S4 to S7 are executed repeatedly.

On the other hand, for example, in the case there is an obstacle from which the distance to the vehicle 10 is predicted to become less than the predetermined threshold in a period of time until the predetermined time elapses from the current time point, the contact prediction unit 213 determines that there is a possibility of contact with the obstacle, in step S5. Then, the contact prediction unit 213 reports, to the record control unit 214 and the contact detection unit 216, that there is a possibility of contact with the obstacle, and the process proceeds to step S8.

In step S8, the record control unit 214 starts recording data. Specifically, the record control unit 214 starts a process of extracting necessary data from the sensor data from the sensor unit 201, the image data from the image capturing unit 202, and the sound data from the sound collection unit 203, and recording the extracted data in the storage unit 111 in FIG. 1. Note that data to be recorded is, for example, data which is used for detection of movement of the vehicle and movement of an obstacle and for detection of a contact sound, and which is necessary to verify or prove contact or non-contact with the obstacle, or to find the cause of contact with the obstacle afterwards, for example.

In step S9, whether or not a contact sound has been detected is determined as in the process in step S6. In the case where it is determined that a contact sound has been detected, the process proceeds to step S10.

In step S10, the contact detection unit 216 determines whether or not the type of the obstacle matches an object type deduced from the contact sound. Specifically, the contact detection unit 216 compares the type of the obstacle detected by the obstacle detection unit 212 with the object type deduced by the contact sound detection unit 215 on the basis of the contact sound. In the case where these types do not match each other, the contact detection unit 216 determines that the type of the obstacle does not match the object type deduced from the contact sound, and then, the process proceeds to step S11.

In step S11, non-occurrence of contact with the obstacle is reported as in the process in step S7.

Thereafter, the process proceeds to step S12.

On the other hand, in the case where it is determined that no contact sound has been detected in step S9, steps S10 and S11 are skipped, and the process proceeds to step S12.

In step S12, the movement of the vehicle 10 and the movement of the obstacle are predicted as in the process in step S4.

In step S13, whether or not there is a possibility of contact with the obstacle is determined, as in the process in step S5. In the case where it is determined that there is a possibility of contact with the obstacle, the process returns to step S9.

Thereafter, until it is determined that the type of the obstacle matches an object type deduced from a contact sound in step S10 or until it is determined that there is no possibility of contact with the obstacle in step S13, steps S9 to S13 are executed repeatedly.

On the other hand, in the case where it is determined that there is no possibility of contact with the obstacle in step S13, that is, in the case where a state with a possibility of contact with the obstacle is shifted to a state with no possibility of contact with the obstacle, the process proceeds to step S14.

In step S14, the record control unit 214 stops data recording. In other words, the record control unit 214 stops data recording which was started in step S8.

Thereafter, the process returns to step S4, and then, step S4 and the following steps are executed.

On the other hand, in the case where the type of the obstacle is determined to match an object type deduced from a contact sound, the process proceeds to step S15.

In step S15, the contact detection unit 216 reports occurrence of contact with the obstacle. For example, the contact detection unit 216 supplies data indicating that contact with the obstacle has occurred and indicating the type of the obstacle with which the contact has occurred, etc., to the action planning unit 162 and the operation planning unit 163, etc., in FIG. 1.

Thereafter, for example, refuge of the vehicle 10 to a safe position, stop of the vehicle 10, or a process, such as an accident process, for addressing the contact with the obstacle is automatically executed.

Then, the contact detection process is ended.

As described so far, the accuracy of detecting contact between the vehicle 10 and an obstacle can be improved.

Figure 5:
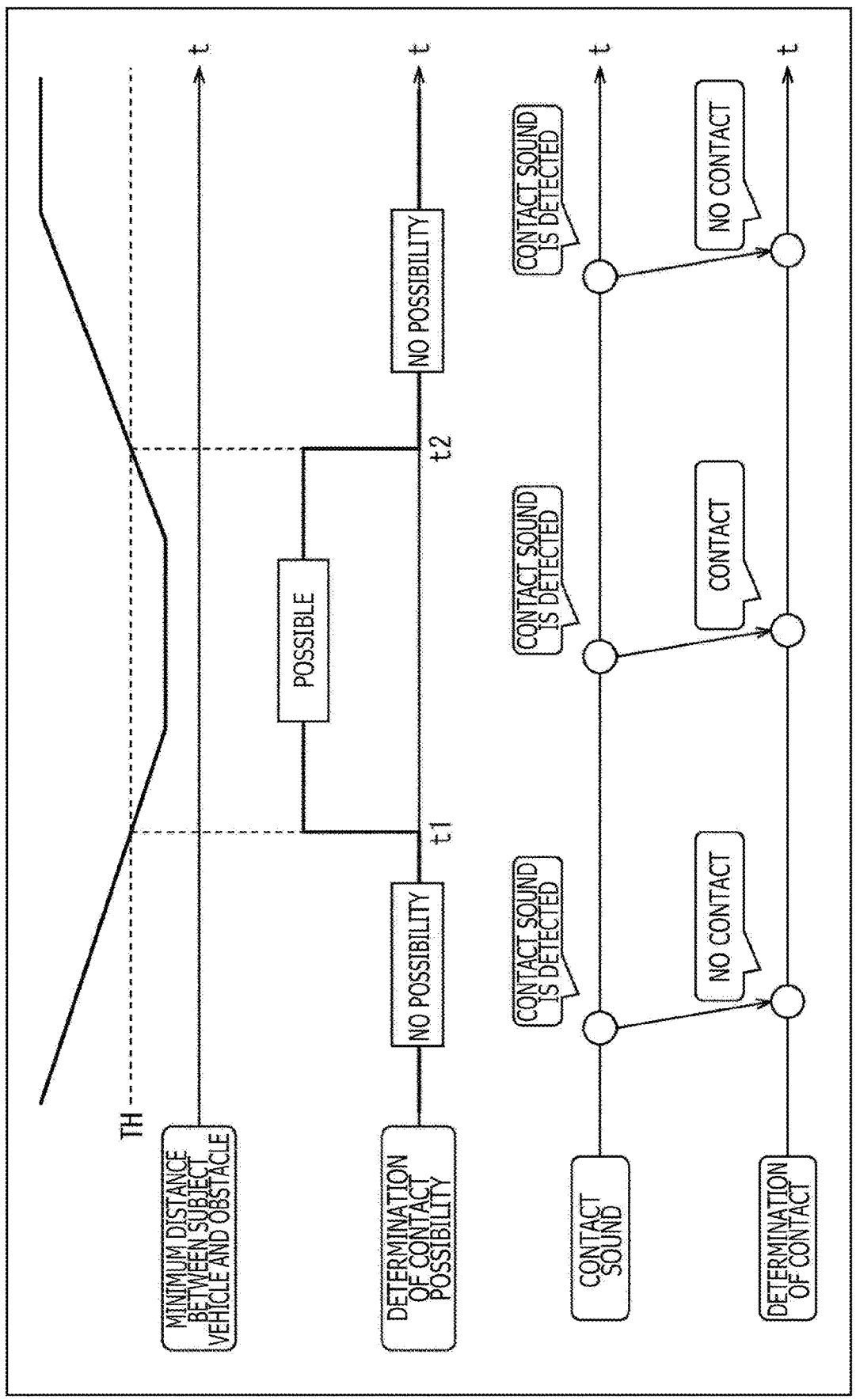
FIG. 5 is a diagram depicting an example of determining contact with an obstacle.

For example, in the case where the minimum distance between the vehicle 10 and the obstacle changes as illustrated in the graph in FIG. 5, it is determined that there is no possibility of contact with the obstacle in a period of time before time t1 and a period of time after time t2 during which the minimum distance is equal to or greater than a threshold TH. Even if a contact sound is detected during these periods of time, it is determined that there is no possibility of a contact with the obstacle.

On the other hand, it is determined that there is a possibility of contact with the obstacle during a period of time from time t1 to t2 during which the minimum distance is lower than the threshold TH. In the case where a contact sound is detected during this period of time, it is determined that contact with the obstacle has occurred.

Accordingly, erroneous detection of contact with an obstacle caused by erroneous detection of a contact sound while there is no possibility of contact with the obstacle, can be prevented. In addition, for example, even in the case where detection of the position of an obstacle is difficult because the obstacle has entered a dead angle of the sensor unit 201 or the image capturing unit 202, contact with the obstacle is reliably detected on the basis of a contact sound when there is a possibility of contact with the obstacle.

Moreover, during a period of time during which a possibility of contact with an obstacle is predicted, necessary data is extracted from the sensor data, the image data, and the sound data and recorded. Thus, it is easy to verify or prove contact or non-contact with the obstacle, or to find the cause of contact with the obstacle. Furthermore, since data recording is performed only during a period of time during which a possibility of contact with an obstacle is predicted, the volume of data to be recorded is reduced.

In addition, since the accuracy of detecting contact with an obstacle is improved, the necessity for an occupant in a vehicle to pay attention to the surrounding environment during automatic driving is reduced.

3. Second Embodiment

Next, a second embodiment according to the present technique will be explained with reference to FIGS. 6 and 7.

<Configuration Example of Contact Detection System>

Figure 6:
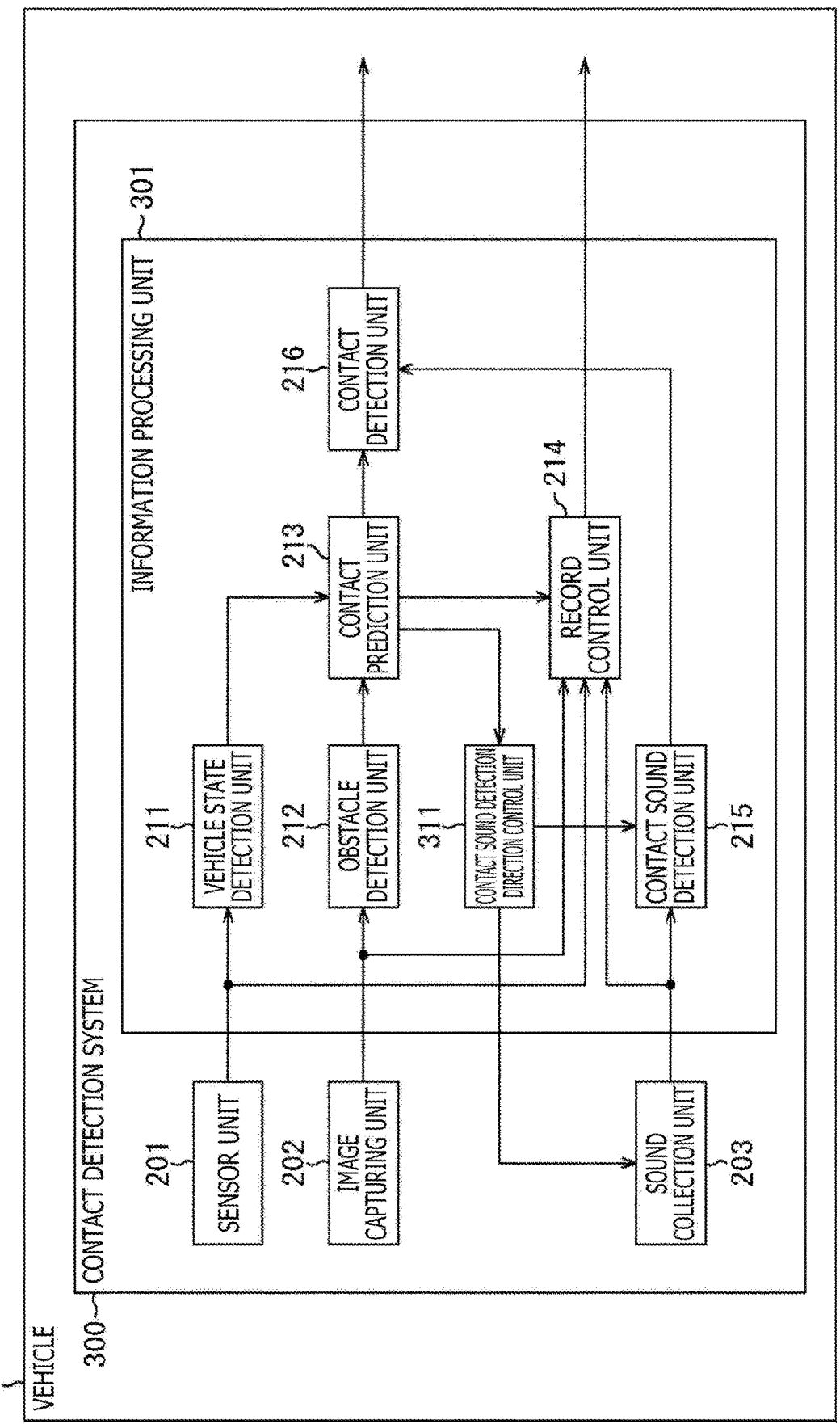
FIG. 6 is a block diagram depicting a second embodiment of the contact detection system to which the present technique has been applied.
Figure 7:
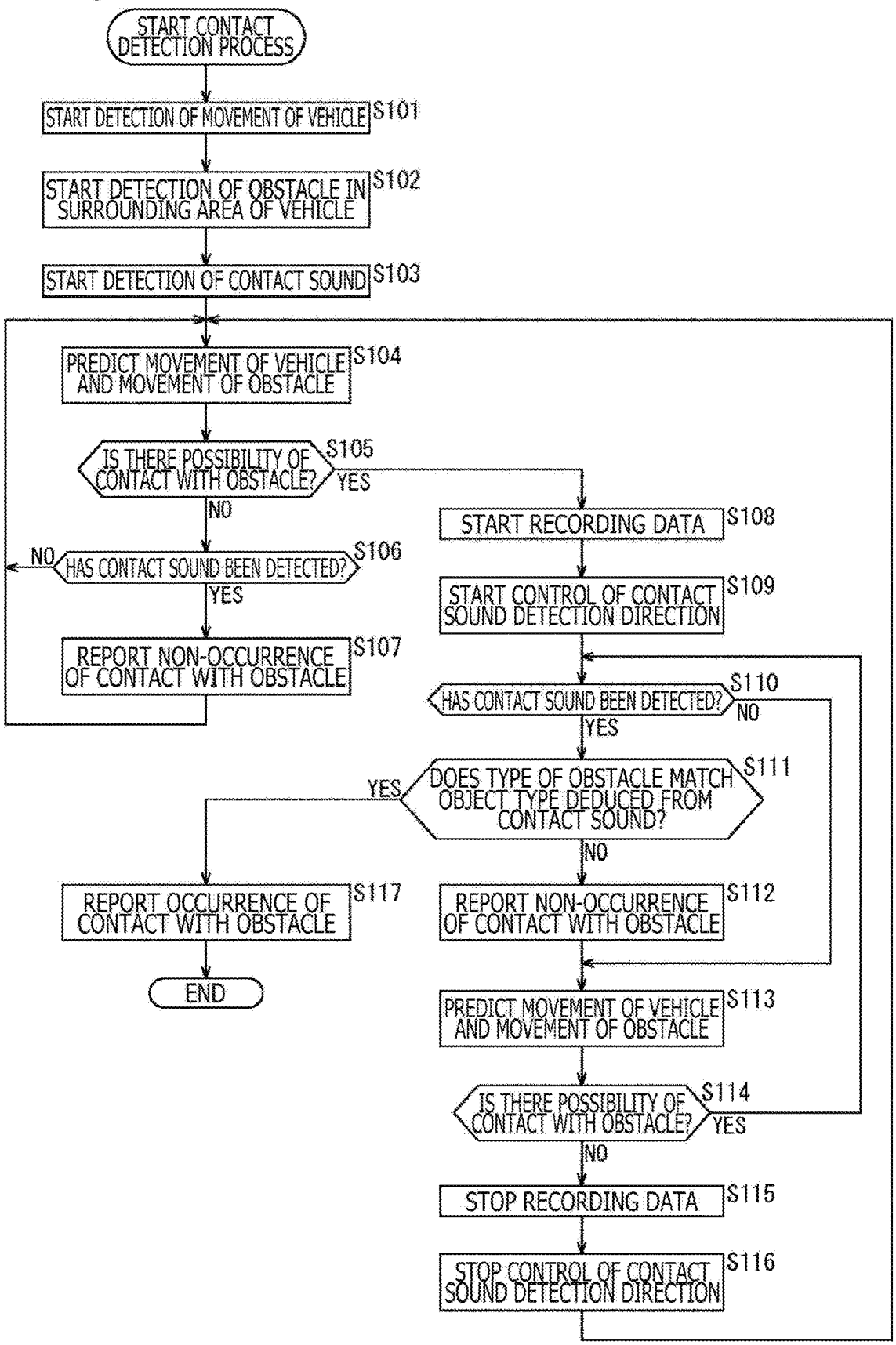
FIG. 7 is a flowchart for giving an explanation on a second embodiment of a contact detection process.

FIG. 6 is a block diagram depicting a configuration example of a contact detection system 300 which is a second embodiment of the contact detection system to which the present technique has been applied. Note that, in FIG. 6, components corresponding to those in FIG. 2 are denoted by the same reference signs, and an explanation thereof will be omitted, as appropriate.

The contact detection system 300 differs from the contact detection system 200 in FIG. 2 in that an information processing unit 301 is provided in place of the information processing unit 204. The information processing unit 301 differs from the information processing unit 204 in that a contact sound detection direction control unit 311 is added.

The contact sound detection direction control unit 311 acquires a prediction result of movement of an obstacle, from the contact prediction unit 213. Then, the contact sound detection direction control unit 311 controls the sound collection unit 203 and the contact sound detection unit 215 on the basis of a predicted position (movement) of the obstacle, and thereby controls a direction for sound detection.

<Contact Detection Process>

Next, a contact detection process which is executed by the contact detection system 300 will be explained with reference to a flowchart in FIG. 7. Note that this process is started and ended under the same conditions as those for the contact detection process in FIG. 3.

Figure 3:
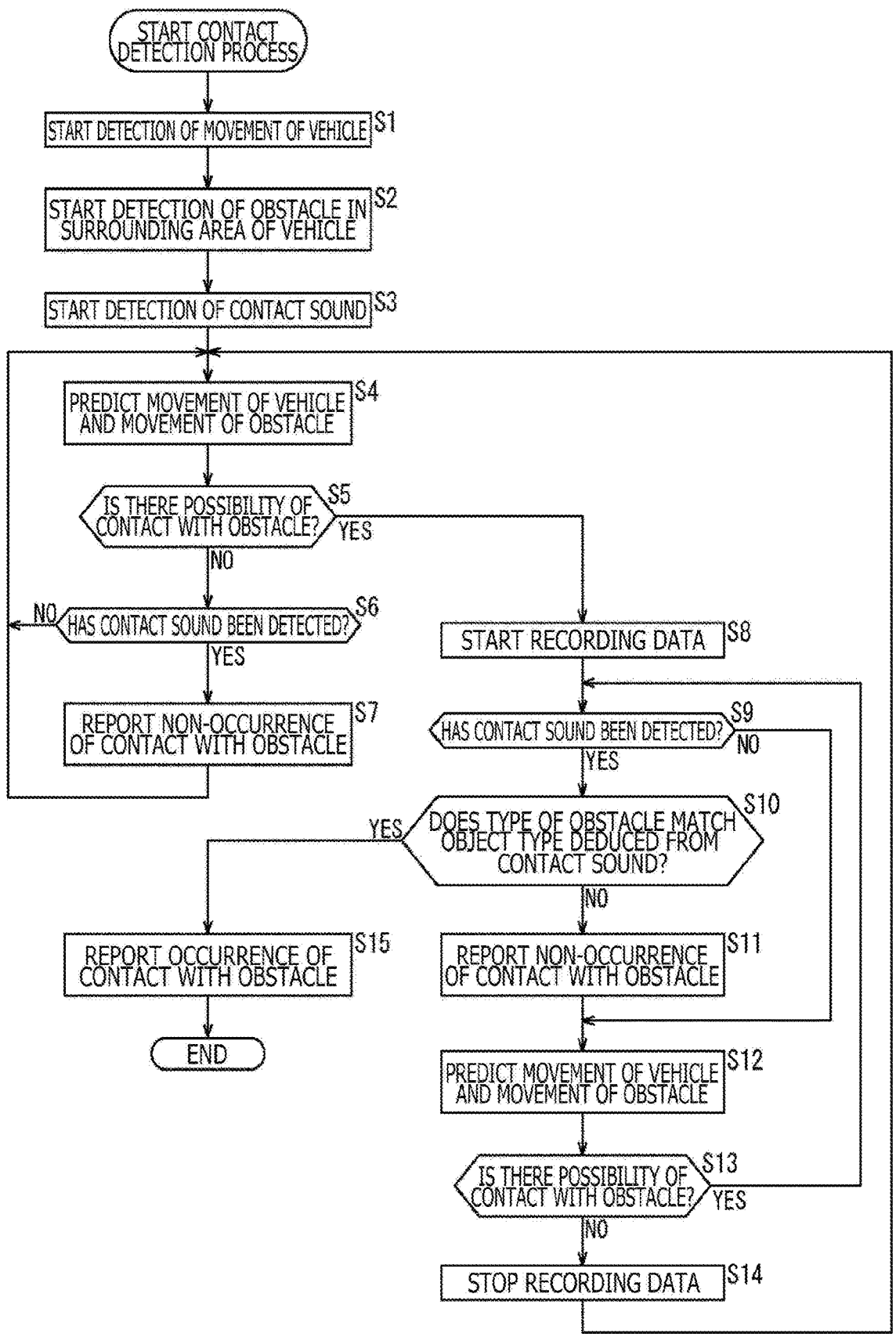
FIG. 3 is a flowchart for giving an explanation on a first embodiment of a contact detection process.

In steps S101 to S107, processing similar to that in steps S1 to S7 in FIG. 3 is executed.

Next, in step S105, in the case where it is determined there is a possibility of contact with an obstacle, the contact prediction unit 213 reports, to the record control unit 214 and the contact detection unit 216, that there is a possibility of contact with the obstacle. Further, the contact prediction unit 213 supplies a prediction result of movement of the obstacle to the contact sound detection direction control unit 311. Thereafter, the process proceeds to step S108.

In step S108, data recording is started as in the process in step S8 in FIG. 3.

In step S109, the contact sound detection direction control unit 311 starts control of the detection direction of a contact sound. In other words, the contact sound detection direction control unit 311 controls the sound collection unit 203 and the contact sound detection unit 215 on the basis of a predicted position of the obstacle such that a sound generated in a direction closer to the obstacle direction is more likely to be detected, and a sound generated in a direction farther from the obstacle direction is less likely to be detected.

For example, the contact sound detection direction control unit 311 performs control to adjust the physical direction or the directivity direction of a microphone included in the sound collection unit 203, toward a predicted direction of the obstacle.

For example, in the case where the sound collection unit 203 includes a plurality of microphones, the contact sound detection direction control unit 311 makes an adjustment such that the sensitivity of a microphone having a directivity closer to the predicted obstacle direction becomes higher while the sensitivity of a microphone having a directivity farther from the predicted obstacle direction becomes lower.

For example, the contact sound detection unit 215 executes a detection process of contact sounds while placing more importance (for example, by imparting a greater weight) to a sound generated in a direction closer to a predicted direction of the obstacle, under control of the contact sound detection direction control unit 311.

Accordingly, the accuracy of detecting a contact sound is improved. In other words, a contact sound which is generated due to contact between the vehicle 10 and an obstacle is detected more reliably, whereby sounds other than the contact sound are prevented from being erroneously detected as contact sounds.

In steps S110 to S115, processing similar to that in steps S9 to S14 in FIG. 3 is executed.

In step S116, the contact sound detection direction control unit 311 stops control of the detection direction of a contact sound.

Thereafter, the process returns to step S104, and step S104 and the following steps are executed.

On the other hand, in the case where it is determined that the type of the obstacle matches an object type deduced from a contact sound in step S111, the process proceeds to step S117.

In step S117, occurrence of contact with the obstacle is reported as in the process in step S15 in FIG. 3, and then, the process is ended.

As described so far, the accuracy of detecting a contact sound is improved, and thus, the accuracy of detecting contact between the vehicle 10 and an obstacle is improved.

4. Modification

Hereinafter, a modification of the aforementioned embodiments according to the present disclosure will be explained.

Note that, the example in which a detection result of a contact sound is used for detection of contact between the vehicle 10 and an obstacle, has been given by the aforementioned explanation. However, an event, other than a contact sound, which is generated due to contact between the vehicle 10 and an obstacle, may be used. Specifically, for example, a detection result of vibration of the body of the vehicle 10 by a vibration sensor or the like, or a detection result of contact of the body of the vehicle 10 with an object by a contact sensor or the like can be used. For example, it may be determined that the vehicle 10 has come into contact with an obstacle in the case where vibration of the body of the vehicle 10 or contact of an object with the body is detected during a period of time during which a possibility of contact with the obstacle is predicted.

In addition, detection of contact between the vehicle 10 and an obstacle may be conducted by a combination of detection results of a plurality of events among events including a contact sound, vibration of the body, and a contact of an object with the body, for example.

Furthermore, for example, during a period of time during which no possibility of contact with an obstacle is predicted by the contact prediction unit 213, the contact detection unit 216 may halt the detection process for contact with the obstacle.

In addition, in the aforementioned explanation, whether the type of an obstacle having a possibility of being brought into contact matches an object type deduced from a contact sound is determined. However, this determination process may be omitted. In other words, in the case where a contact sound is detected during a period of time during which a possibility of contact with an obstacle is predicted, it may be determined that the vehicle 10 has come into contact with the obstacle without execution of the above determination process.

Furthermore, for example, in order to improve the accuracy of detecting a contact sound, the contact sound detection unit 215 may remove estimated noise from the sound data supplied from the sound collection unit 203, prior to the detection of a contact sound.

For example, the contact sound detection unit 215 may predict an engine sound or a motor sound on the basis of the rotational speed of an engine or a motor in the vehicle 10, and selectively remove the predicted engine sound or motor sound from the sound data. Moreover, for example, the contact sound detection unit 215 may predict road noise on the basis of the speed of the vehicle 10, and selectively remove the predicted road noise from the sound data. In addition, for example, the contact sound detection unit 215 may selectively remove wind noise from the sound data. Furthermore, for example, in the case where a microphone is provided in the interior of the vehicle, the contact sound detection unit 215 may selectively remove sounds of an in-vehicle car stereo or radio, conversations, and the like, from the sound data. With this configuration, the installation place of the sound collection unit 203 can be set irrespective of a noise occurrence source, and thus, a contact sound can be detected more effectively.

5. Others

<Configuration Example of Computer>

A series of the aforementioned processes can be executed by hardware, or can be executed by software. In the case where the series of the processes is executed by software, a program constituting the software is installed in a computer. Here, examples of the computer include a computer incorporated in a dedicated hardware and a general-purpose personal computer capable of implementing various functions by installing various programs thereinto.

Figure 8:
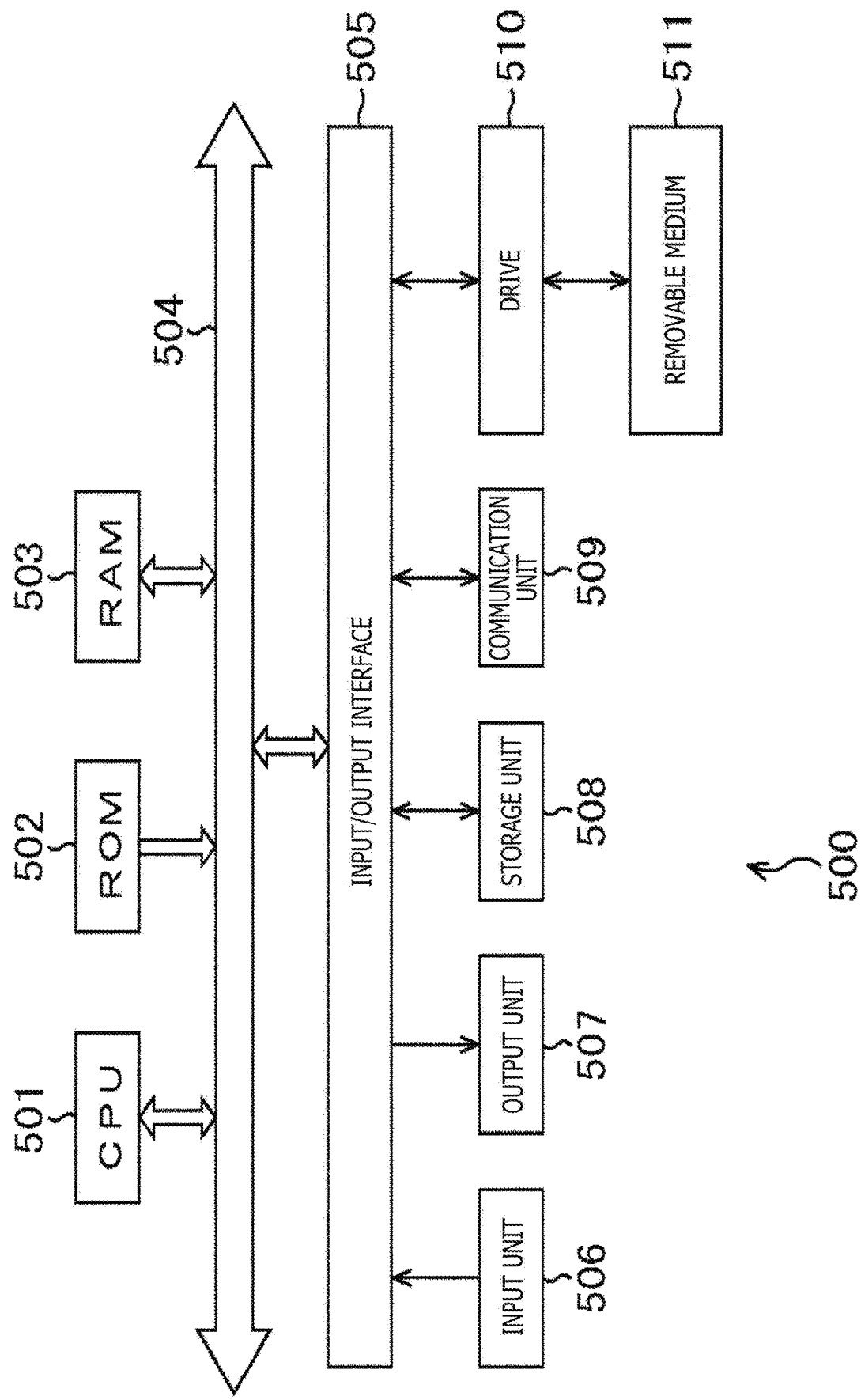
FIG. 8 is a diagram depicting a configuration example of a computer.

FIG. 8 is a block diagram depicting a hardware configuration example of a computer that executes the aforementioned series of processes by using a program.

In a computer 500, a CPU (Central Processing Unit) 501, a ROM (Read Only Memory) 502, and a RAM (Random Access Memory) 503 are mutually connected via a bus 504.

Further, an input/output interface 505 is connected to the bus 504. An input unit 506, an output unit 507, a storage unit 508, a communication unit 509, and a drive 510 are connected to the input/output interface 505.

The input unit 506 includes an input switch, a button, a microphone, an image capturing element, or the like. The output unit 507 includes a display, a loudspeaker, or the like. The storage unit 508 includes a hard disk, a non-volatile memory, or the like. The communication unit 509 includes a network interface or the like. The drive 510 drives a removable recording medium 511 such as a magnetic disk, an optical disk, a magneto-optical disk, or a semiconductor memory.

In the computer 500 having the above configuration, the CPU 501 loads a program recorded in the storage unit 508, for example, into the RAM 503 via the input/output interface 505 and the bus 504, and executes the program, whereby the aforementioned series of processes is executed.

For example, a program which is executed by the computer 500 (CPU 501) can be provided by being recorded in the removable recording medium 511 serving as a package medium or the like. Alternatively, the program can be provided via a wired or wireless transmission medium such as a local area network, the Internet, or digital satellite broadcasting.

In the computer 500, the program can be installed into the storage unit 508 via the input/output interface 505 through attachment of the removable recording medium 511 to the drive 510. Further, the program can be received at the communication unit 509 via a wired or wireless transmission medium, and be installed into the storage unit 508. Alternatively, the program may preliminarily be installed in the ROM 502 or in the storage unit 508.

Note that a program which is executed by the computer may be a program through which processes are executed in the time-series order explained herein, or may be a program through which processes are each executed at a necessary timing such as a timing when a call is made.

In the present description, a system means a set of plural constituent elements (devices, modules (components), etc.), and whether or not all the constituent elements are disposed in the same casing is not considered. Therefore, a system refers to a set of plural devices housed in separate casings and connected to one another via a network, and also refers to one device having plural modules housed in one casing.

Furthermore, the embodiments according to the present technique are not limited to the aforementioned embodiments, and various changes can be made within the gist of the present technique.

For example, the present technique can be configured by cloud computing in which one function is shared, and cooperatively processed by a plurality of devices via a network.

In addition, steps having been explained with reference to the aforementioned flowcharts may be executed by one device, or may be shared and executed by devices.

Furthermore, in the case where one step includes plural processes, the plural processes included in the one step may be executed by one device, or may be shared and executed by plural devices.

<Configuration Combination Example>

The present technique may also have the following configurations.

(1)

An information processing device including:

an obstacle detection unit that detects an obstacle in a surrounding area of a vehicle;

a contact prediction unit that predicts a contact between the vehicle and the obstacle on the basis of a detection result of the obstacle;

an event detection unit that detects an event which occurs due to contact between the vehicle and an object; and a contact detection unit that detects contact between the vehicle and the obstacle on the basis of a detection result of the event during a period of time during which a possibility of contact between the vehicle and the obstacle is predicted.

(2)

The information processing device according to (1), in which the event includes at least one of a contact sound, vibration of a body of the vehicle, or contact of an object with the body.

(3)

The information processing device according to (2), in which the contact detection unit determines whether or not the vehicle has come into contact with the obstacle, on the basis of whether or not a type of the obstacle matches an object type deduced from the contact sound.

(4)

The information processing device according to (2) or (3), further including:

a contact sound detection direction control unit that controls a direction for detecting the contact sound, on the basis of a position of the obstacle, during the period of time during whicha possibility of contact between the vehicle and the obstacle is predicted.

(5)

The information processing device according to any one of (1) to (4), in which in a case where the event is detected during the period of time during which a possibility of contact between the vehicle and the obstacle is predicted, the contact detection unit determines that the vehicle has come into contact with the obstacle.

(6)

The information processing device according to (5), in which in a case where the event is detected during a period of time other than the period of time during which a possibility of contact between the vehicle and the obstacle is predicted, the contact detection unit determines that no contact has occurred between the vehicle and the obstacle.

(7)

The information processing device according to any one of (1) to (6), further including:

a record control unit that performs control to record at least a part of data for use in detection of the obstacle and the event, during the period of time during which a possibility of contact between the vehicle and the obstacle is predicted.

(8)

The information processing device according to any one of (1) to (7), further including:

a vehicle state detection unit that detects movement of the vehicle, in which the obstacle detection unit detects movement of the obstacle, and the contact prediction unit predicts contact between the vehicle and the obstacle on the basis of the detected movement of the vehicle and the detected movement of the obstacle.

(9)

An information processing method including, by means of an information processing device:

detecting an obstacle in a surrounding area of a vehicle;

predicting contact between the vehicle and the obstacle on the basis of a detection result of the obstacle;

detecting an event which occurs due to contact between the vehicle and an object; and detecting contact between the vehicle and the obstacle on the basis of a detection result of the event during a period of time during which a possibility of contact between the vehicle and the obstacle is predicted.

(10)

A program for causing a computer to execute a process including:

an obstacle detection step of detecting an obstacle in a surrounding area of a vehicle;

a contact prediction step of predicting contact between the vehicle and the obstacle on the basis of a detection result of the obstacle;

an event detection step of detecting an event which occurs due to contact between the vehicle and an object; and a contact detection step of detecting contact between the vehicle and the obstacle on the basis of a detection result of the event during a period of time during which a possibility of contact between the vehicle and the obstacle is predicted.

(11)

A vehicle including:

a data acquisition unit that acquires data for use in detection of an obstacle in a surrounding area and detection of an event which occurs due to contact with an object;

an obstacle detection unit that detects the obstacle on the basis of the acquired data;

a contact prediction unit that predicts contact with the obstacle on the basis of a detection result of the obstacle;

an event detection unit that detects the event on the basis of the acquired data; and a contact detection unit that detects contact with the obstacle on the basis of a detection result of the event, during a period of time during which a possibility of contact between the vehicle and the obstacle is predicted.

REFERENCE SIGNS LIST

10 Vehicle, 100 Vehicle control system, 131 Detection unit, 133 Condition analysis unit, 200 Contact detection system, 201 Sensor unit, 202 Image Capturing unit, 203 Sound collection unit, 204 Information processing unit, 211 Vehicle state detection unit, 212 Obstacle detection unit, 213 Contact prediction unit, 214 Record control unit, 215 Contact sound detection unit, 216 Contact detection unit, 300 Contact detection system, 301 Information processing unit, 311 Contact sound detection direction control unit

The invention claimed is:

1. An information processing device, comprising:
a processor configured to:
   detect an obstacle in a surrounding area of a vehicle;
   predict contact between the vehicle and the obstacle based on a result of the detection of the obstacle;
   control a detection direction for detection of a contact sound as an event;
   wherein
      the event occurs due to contact between the vehicle and an object, and
      the control of the detection direction is based on a position of the obstacle at a first period of time;
   detect the contact sound as the event which occurs due to the contact between the vehicle and the object, wherein the contact sound is detected based on the detection direction;
   determine a type of the object based on the contact sound;
   compare the determined type of the object with a type of the detected obstacle;
   determine whether the event has occurred at the first period of time in which the contact between the vehicle and the obstacle is predicted; and
   detect the contact between the vehicle and the obstacle based on:
      the determination that the event has occurred at the first period of time in which the contact between the vehicle and the obstacle is predicted, and
      a result of the comparison of the determined type of the object with the type of the detected obstacle.

2. The information processing device according to claim 1, wherein the event includes at least one of the contact sound, vibration of a body of the vehicle, or contact of the object with the body.

3. The information processing device according to claim 1, wherein
   in a case where the event is detected at a second period of time, the processor is further configured to determine that no contact has occurred between the vehicle and the obstacle, and
   the second period of time is different from the first period of time.

4. The information processing device according to claim 1, wherein the processor is further configured to record at least a part of data for the detection of the obstacle and the event at the first period of time.

5. The information processing device according to claim 1, wherein the processor is further configured to:
   detect movement of the vehicle;
   detect movement of the obstacle;
   predict the movement of the obstacle based on the detected movement of the obstacle; and
   predict the contact between the vehicle and the obstacle based on the detected movement of the vehicle and the predicted movement of the obstacle.

6. The information processing device according to claim 1, wherein the processor is further configured to:
   determine the type of the detected obstacle is different from the determined type of the object based on the comparison; and
   determine non-occurrence of the contact between the vehicle and the obstacle based on the determination that the type of the detected obstacle is different from the determined type of the object.

7. An information processing method, comprising:
in an information processing device:
   detecting an obstacle in a surrounding area of a vehicle;
   predicting contact between the vehicle and the obstacle based on a result of the detection of the obstacle;
   controlling a detection direction for detection of a contact sound as an event, wherein
      the event occurs due to contact between the vehicle and an object, and
      the control of the detection direction is based on a position of the obstacle at a specific period of time;
   detecting the contact sound as the event which occurs due to the contact between the vehicle and the object, wherein the contact sound is detected based on the detection direction;
   determining a type of the object based on the contact sound;
   comparing the determined type of the object with a type of the detected obstacle;
   determining whether the event has occurred at the specific period of time in which the contact between the vehicle and the obstacle is predicted; and detecting the contact between the vehicle and the obstacle based on:
    the determination that the event has occurred at the specific period of time in which the contact between the vehicle and the obstacle is predicted, and
    a result of the comparison of the determined type of the object with the type of the detected obstacle.

8. A non-transitory computer-readable medium having stored thereon, computer-executable instructions which, when executed by a computer, cause the computer to execute operations, the operations comprising:
    detecting an obstacle in a surrounding area of a vehicle;
    predicting contact between the vehicle and the obstacle based on a result of the detection of the obstacle;
    controlling a detection direction for detection of a contact sound as an event, wherein
        the event occurs due to contact between the vehicle and an object, and
        the control of the detection direction is based on a position of the obstacle at a specific period of time;
    detecting the contact sound as the event which occurs due to the contact between the vehicle and the object, wherein the contact sound is detected based on the detection direction;
    determining a type of the object based on the contact sound;
    comparing the determined type of the object with a type of the detected obstacle;
    determining whether the event has occurred at the specific period of time in which the contact between the vehicle and the obstacle is predicted; and
    detecting the contact between the vehicle and the obstacle based on:
        the determination that the event has occurred at the specific period of time in which the contact between the vehicle and the obstacle is predicted, and
        a result of the comparison of the determined type of the object with the type of the detected obstacle.

9. A vehicle, comprising:
a processor configured to:
    acquire data related to detection of an obstacle in a surrounding area of the vehicle and detection of an event which occurs due to contact with an object;
    detect the obstacle based on the acquired data;
    predict contact with the obstacle based on a result of the detection of the obstacle;
    control a detection direction for detection of a contact sound as the event which occurs due to the contact with the object, wherein the control of the detection direction is based on a position of the obstacle at a specific period of time;
    detect the contact sound as the event which occurs due to the contact between the vehicle and the object, wherein the contact sound is detected based on the detection direction;
    determine a type of the object based on the contact sound;
    compare the determined type of the object with a type of the detected obstacle;
    determine whether the event has occurred at the specific period of time in which the contact between the vehicle and the obstacle is predicted; and
    detect the contact with the obstacle based on:
        the determination that the event has occurred at the specific period of time in which the contact between the vehicle and the obstacle is predicted, and
        a result of the comparison of the determined type of the object with the type of the detected obstacle.

* * * * *